United States Patent
Nomura

(10) Patent No.: US 9,994,078 B2
(45) Date of Patent: Jun. 12, 2018

(54) PNEUMATIC TIRE

(71) Applicant: SUMITOMO RUBBER INDUSTRIES, LTD., Kobe-shi, Hyogo (JP)

(72) Inventor: Seiji Nomura, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 64 days.

(21) Appl. No.: 14/912,231

(22) PCT Filed: Aug. 22, 2014

(86) PCT No.: PCT/JP2014/072037
§ 371 (c)(1),
(2) Date: Feb. 16, 2016

(87) PCT Pub. No.: WO2015/033804
PCT Pub. Date: Mar. 12, 2015

(65) Prior Publication Data
US 2016/0200148 A1 Jul. 14, 2016

(30) Foreign Application Priority Data
Sep. 9, 2013 (JP) .................................. 2013-186654

(51) Int. Cl.
*B60C 11/03* (2006.01)

(52) U.S. Cl.
CPC ...... *B60C 11/0304* (2013.01); *B60C 11/0302* (2013.01); *B60C 11/032* (2013.01); (Continued)

(58) Field of Classification Search
CPC ............. B60C 11/0304; B60C 11/0302; B60C 11/032
See application file for complete search history.

(56) References Cited

U.S. PATENT DOCUMENTS 3,532,147 A 10/1970 Gough et al.
3,768,535 A 10/1973 Holden
(Continued)

FOREIGN PATENT DOCUMENTS

EP 2 202 097 A2 6/2010
JP 3-86606 A 4/1991
(Continued)

OTHER PUBLICATIONS

JP03086606 as cited in the machine translation as viewed at https://www4.j-platpat.inpit.go.jp/cgi-bin/tran_web_cgi_ejje?u=http://www4.j-platpat.inpit.go.jp/eng/translation/201706100346490462770694810200746A91EE3C15803-F4E22D47E886888EA822 on Jun. 9, 2017.*

(Continued)

*Primary Examiner* — Jodi C Franklin
(74) *Attorney, Agent, or Firm* — Birch, Stewart, Kolasch & Birch LLP

(57) ABSTRACT

A pneumatic tire (1) includes a tread portion (2) having at least one heat-dissipating recess portion (9). The recess portion (9) includes an opening edge (10) and an inner wall portion (11). The opening edge (10) includes a linear first edge (10*a*) and second edge (10*b*) opposite each other. The inner wall portion (11) includes a first wall surface (11*a*) extending from the first edge (10*a*) to a bottom portion (9*a*) at the deepest position of the recess portion (9), and a second wall surface (11*b*) extending from the second edge (10*b*) to the bottom portion (9*a*). An inclination angle ([theta]1) of the first wall surface (11*a*) with respect to a first normal (12*a*) to a contact surface passing the first edge (10*a*) is greater than an inclination angle ([theta]2) of a second wall surface (22*b*) with respect to a second normal (23*b*) to the contact surface passing the second edge (21*b*).

14 Claims, 6 Drawing Sheets

(52) U.S. Cl.
CPC ..... *B60C 11/0327* (2013.01); *B60C 2011/039* (2013.01); *B60C 2011/0334* (2013.01); *B60C 2011/0344* (2013.01); *B60C 2011/0348* (2013.01); *B60C 2011/0358* (2013.01); *B60C 2011/0381* (2013.01)

(56) References Cited

U.S. PATENT DOCUMENTS

| | | | | |
|---|---|---|---|---|
| 4,437,503 | A * | 3/1984 | Seitz | B60C 11/032 152/209.17 |
| 2005/0257870 | A1 * | 11/2005 | Ohsawa | B60C 11/01 152/209.9 |
| 2011/0308676 | A1 * | 12/2011 | Morozumi | B60C 11/032 152/153 |
| 2014/0224395 | A1 * | 8/2014 | Kawakami | B60C 11/0306 152/209.18 |

FOREIGN PATENT DOCUMENTS

| | | |
|---|---|---|
| JP | 2004-90798 A | 3/2004 |
| JP | 2009-101785 A | 5/2009 |
| JP | 2010-155504 A | 7/2010 |
| WO | WO 2013/035889 A1 | 3/2013 |

OTHER PUBLICATIONS

Extended European Search Report, dated Mar. 17, 2017, for European Application No. 14841789.2.

International Search Report, issued in PCT/JP2014/072037, dated Nov. 18, 2014.

Written Opinion of the International Searching Authority, issued in PCT/JP2014/072037(PCT/ISA/237), dated Nov. 18, 2014.

* cited by examiner

PNEUMATIC TIRE

TECHNICAL FIELD

The present invention relates to a pneumatic tire including a cooling recess portion on a tread portion.

BACKGROUND ART

Conventionally, a pneumatic tire including a tread portion having a tread pattern with a cooling recess portion has been proposed (see the following patent literature 1, for example). The recess portion, for example, includes a circular opening edge that opens at a ground contacting surface of the tread portion and a cylindrical inner wall that extends inward of the tread portion from the opening edge.

CITATION LIST

Patent Literature

Patent Literature 1: Japanese Unexamined Patent Application Publication No. 2010-155504

SUMMARY OF INVENTION

Technical Problem

In general, since high performance tires have opportunities to travel straight running and turning at high speed often, the temperature of the tread portion is in a higher tendency due to intense friction with the road. Accordingly, the conventional recesses so far were not able to expect a sufficient heat dissipation effect.

In order to improve heat dissipation effect through the recesses, for example, it is conceivable to increase the number of recesses or to increase the volume of the recesses. Unfortunately, these cases may decrease rigidity of the tread portion, thereby deteriorating traveling performance.

The present invention has been made in view of the circumstances as described above, and has a main object to provide a pneumatic tire capable of improving the durability of the tire through the superior heat dissipation while ensuring rigidity of the tread portion.

Solution to Problem

The present invention provides a pneumatic tire including a tread portion provided with at lest one cooling recess portion. The recess portion includes an opening edge opened at a ground contacting surface of the tread portion and an inner wall extending inward of the tread portion from the opening edge. The opening edge includes a linearly extending first edge and a linearly extending second edge facing one another. The inner wall includes, in a cross-section perpendicular to the first edge, a first wall that extends from the first edge to a deepest bottom of the recess portion and a second wall that extends from the second edge to the bottom. An inclination angle $\theta 1$ of the first wall with respect to a first normal line to the ground contacting surface passing the first edge is greater than an inclination angle $\theta 2$ of the second wall with respect to a second normal line to the ground contacting surface passing the second edge.

In another aspect of the invention, the opening edge preferably includes a closed contour shape.

In another aspect of the invention, the inclination angle $\theta 2$ of the second wall is preferably in a range of from 30 to 85 degrees.

In another aspect of the invention, the first edge and the second edge preferably extend at an angle of not more than 10 degrees with respect to an axial direction of the tire.

In another aspect of the invention, the opening edge preferably includes a trapezoidal shape having the second edge longer than the first edge.

In another aspect of the invention, the recess portion preferably includes the first wall and the second wall which are sharply connected one another at the bottom.

In another aspect of the invention, the second edge preferably has a length in a range of from 3.0 to 10.0 mm.

In another aspect of the invention, the bottom of the recess portion preferably has a depth in a range of from 2.0 to 8.0 mm from the ground contacting surface of the tread portion.

In another aspect of the invention, the tread portion may include a tread pattern having a designated rotational direction, and the second edge is preferably located backward of the first edge in the rotational direction.

In another aspect of the invention, the tread portion may include a tread pattern having an installing direction to a vehicle and a plurality of land portions separated by a plurality of main grooves, and the recess portion is preferably provided on the land portion to be located most inboard of the vehicle when the tire is installed to the vehicle.

In another aspect of the invention, the tread portion may comprises a plurality of block elements separated by a plurality of lateral grooves, and in a planar view of one of the block elements, the opening edge is preferably arranged at a location which includes a center position of a pair of circumferentially adjacent lateral grooves.

Advantageous Effects of Invention

The recess portion of the pneumatic tire in accordance with the present invention includes the opening edge and the inner wall recessed therefrom. The opening edge includes the linear first edge and the linear second edge facing one another. The inner wall includes the first wall that extends from the first edge to the bottom of the recess portion and the second wall that extends from the second edge to the bottom. The inclination angle $\theta 1$ of the first wall is greater than the inclination angle $\theta 2$ of the second wall. According to such a recess portion, air easily enters into the inner wall along the first wall during traveling. The air flowing into the recess portion is released from the inner wall after contacting with the second wall. The present invention may further improve heat dissipation through the recess portion by generating air flow in the recess portion described above which efficiently improves heat exchange between the air and the inner wall of the recess portion.

Accordingly, the pneumatic tire in accordance with the present invention may prevent temperature rise of the tread portion due to sufficient heat dissipation. Thus, a blow out of the tread portion, for example, can be prevented, and the tire durability is improved.

Description of Embodiments

Figure 1:
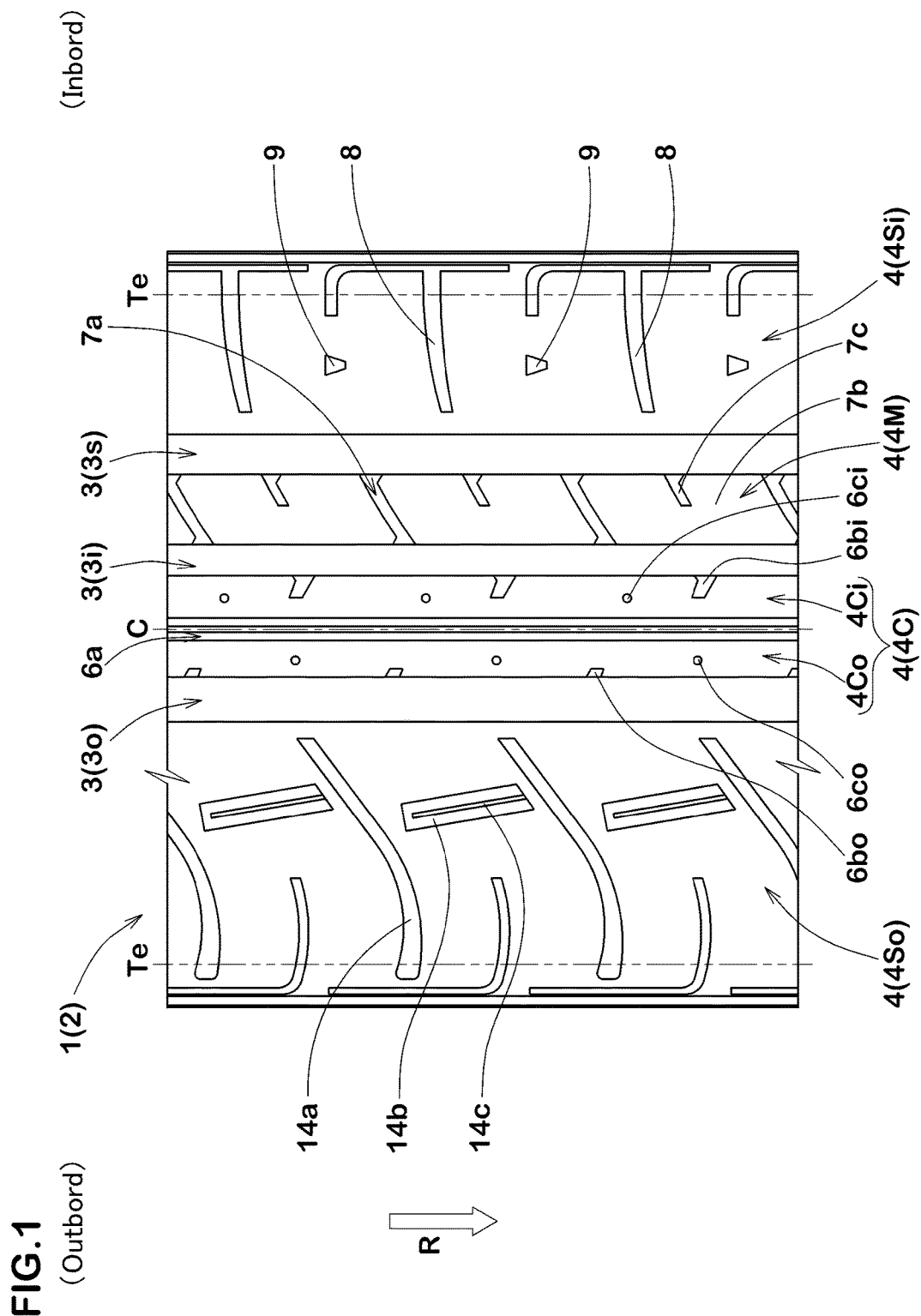
FIG. 1 is a development view of a tread portion in accordance with an embodiment of the invention.

An embodiment of the present invention will be explained below with reference to the accompanying drawings. FIG. 1 is a development view of a tread portion 2 of a pneumatic tire (hereinafter, it may be simply referred to as "tire".) 1 in accordance with an embodiment of the present invention. FIG. 1 illustrates a pneumatic tire for passenger cars, for example. Alternatively, the present invention may be applied to tires of various categories such as racing tires or the like.

As shown in FIG. 1, the tire 1 in accordance with the embodiment includes the tread portion 2 having an asymmetrical pattern. In order to exhibit the characteristics of the tread pattern to maximum, the tire is specified an installation direction to a vehicle and a rotational direction R. The installation direction to a vehicle and the rotational direction R, for example, are identified on a sidewall portion (not shown) of the tire 1 using characters and the like.

The tread portion 2 is provided with a plurality of main grooves 3 and a plurality of land portions 4 separated by the main grooves 3.

The main grooves 3 in accordance with the embodiment, for example, includes three main grooves which include an inboard crown main groove 3i, an outboard crown main groove 3o, and an inboard shoulder main grooves 3s, and which are formed in a straight manner.

For example, the inboard crown main groove 3i is located on a side of an inboard tread edge Te in relation to the tire equator C. The outboard crown main groove 3o is located on a side of an outboard tread edge Te in relation to the tire equator C. The inboard shoulder main grooves 3s is arranged between the inboard crown main grooves 3i and the inboard tread edge Te. These inboard crown main grooves 3i, outboard crown main grooves 3o and inboard shoulder main grooves 3s are useful to ensure pattern rigidity of the tread portion 2 as well as wet performance. However, the construction and arrangement of the main grooves 3 are not limited to the aspect described above.

The tread edge refers to an axially outermost edge of the ground contacting patch which occurs under the condition where a standard tire load is further added to a standard condition when the camber angle of the tire is zero.

The standard condition is such that the tire 1 is mounted on a standard wheel rim (not shown) with a standard pressure but loaded with no tire load. In this specification and claims, various dimensions, positions and the like of the tire 1 refer to those under the standard condition unless otherwise noted.

The standard wheel rim is a wheel rim officially approved or recommended for the tire 1 by standards organizations, wherein the standard wheel rim is the "standard rim" specified in JATMA, the "Measuring Rim" in ETRTO, and the "Design Rim" in TRA or the like, for example.

The standard pressure is a standard pressure officially approved or recommended for the tire 1 by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

The standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like. When the tire is for passenger cars, the standard tire load is defined as an 88% load of the above load.

Figure 2:
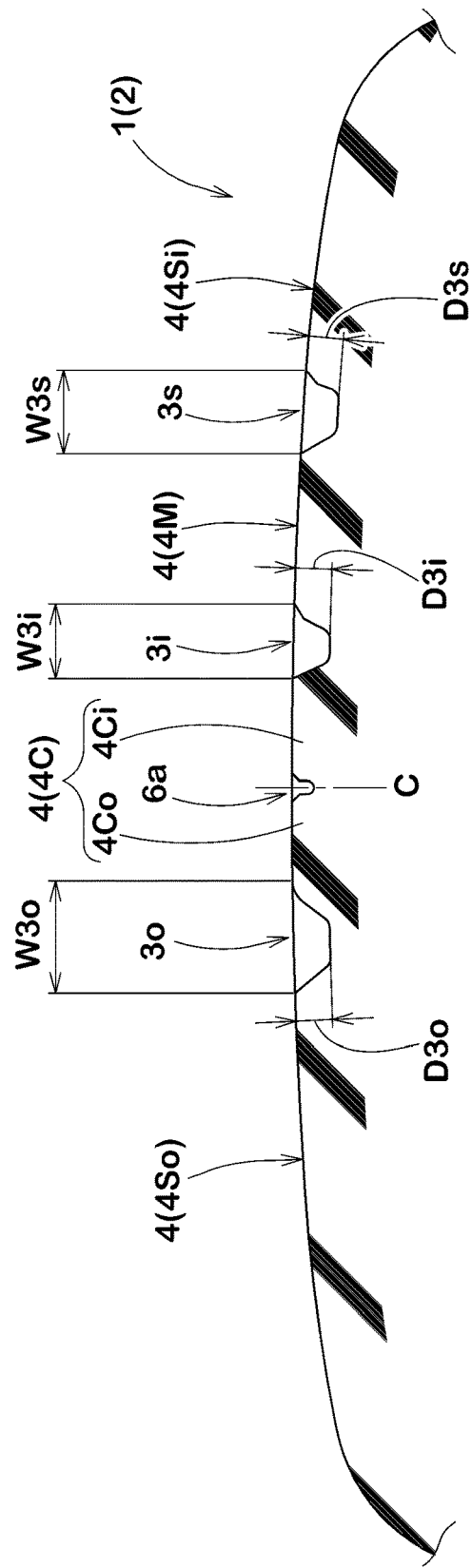
FIG. 2 is a cross-sectional view of the tread portion illustrated in FIG. 1.

FIG. 2 illustrates a meridian cross-section view, which includes the tire rotational axis, of the tread portion 2. As shown in FIG. 2, the inboard crown main groove 3i, the outboard crown main groove 3o and the inboard shoulder main groove 3s have widths W3i, W3o and W3s respectively and which are preferably set in a range of from 5.0 to 20.0 mm, more preferably in a range of from 7.0 to 20.0 mm. In order to improve drainage performance, the width W3o of the outboard crown main groove 3o in accordance with the present embodiment is preferably greater than the width W3i of the inboard crown main groove 3i and the width W3s of the inboard shoulder main groove 3s. In the same point of view, the inboard crown main groove 3i, the outboard crown main groove 3o and the inboard shoulder main groove 3s preferably have depths D3i, D3o and D3s respectively in a range of from 6.0 to 8.0 mm.

As shown in FIG. 1, the land portions 4 in accordance with the present embodiment include a crown land portion 4C, an inboard middle land portion 4M, an outboard shoulder land portion 4So and an inboard shoulder land portion 4Si.

The crown land portion 4C is defined between the inboard crown main groove 3i and the outboard crown main grooves 3o. The inboard middle land portion 4M is defined between the inboard crown main groove 3i and the inboard shoulder main groove 3s. The outboard shoulder land portion 4So is defined between the outboard crown main groove 3o and the outboard tread edge Te. The inboard shoulder land portion 4Si is defined between the inboard shoulder main grooves 3s and the tread edge Te.

The crown land portion 4C in accordance with the present embodiment is provided with a circumferentially extending crown narrow groove 6a, for example. The crown land portion 4C is divided into an inboard crown rib 4Ci and an outboard crown rib 4Co by the crown narrow groove 6a.

The inboard crown rib 4Ci and the outboard crown rib 4Co are provided with a slot 6bi extending from the inboard crown main grooves 3i and a slot 6bo extending from the outboard crown main grooves 3o, respectively, and a circular slot 6ci and a circular slot 6co, respectively. These crown narrow groove 6a, slots 6bi and 6bo, circular slots 6ci and 6co have advantageous effect to dissipate heat of the tread portion 2, thereby preventing temperature rise of the crown land portion 4C.

The inboard middle land portion 4M in accordance with the present embodiment is provided with a plurality of middle lateral grooves 7a each extending from the inboard crown main grooves 3i to the inboard shoulder main groove 3s so as to form a plurality of middle blocks 7b. Each middle block 7b is provided with a cut-like slot 7c extending from the inboard shoulder main grooves 3s in order to prevent temperature rise of the inboard middle land portion 4M, same as slots 6bi and 6bo on the crown land portion 4C.

The outboard shoulder land portion 4So in accordance with the present embodiment is provided with a plurality of shoulder lateral grooves 14a each extending axially inwardly from the outboard tread edge Te to form a block-like portion. The outboard shoulder land portion 4So is provided with a slot 14b and a sipe 14c provided in the slot 14b, in order to optimize rigidity of the land portion while preventing temperature rise. In order to ensure pattern rigidity during cornering, each of the shoulder lateral grooves 14a terminates without reaching the outboard crown main grooves 3o.

The inboard shoulder land portion 4Si in accordance with the present embodiment is provided with a plurality of shoulder lateral grooves 8 each extending axially inwardly from the tread edge Te to form a block-like portion. Each of the shoulder lateral grooves inclines at an angle of from 40 to 90 degrees with respect to the circumferential direction of the tire in order to ensure drainage performance and rigidity. In order to ensure pattern rigidity during cornering, each of the shoulder lateral grooves 8 has an axially inner end that terminates within the inboard shoulder land portion 4Si. Preferably, the shoulder lateral grooves have depths same as depths of the inboard shoulder main grooves 3s.

In the tire 1 in accordance with the present embodiment, the tread portion 2 is provided with at least one cooling recess portion 9. For example, the recess portion 9 is arranged on the inboard shoulder land portion 4Si.

Figure 3:
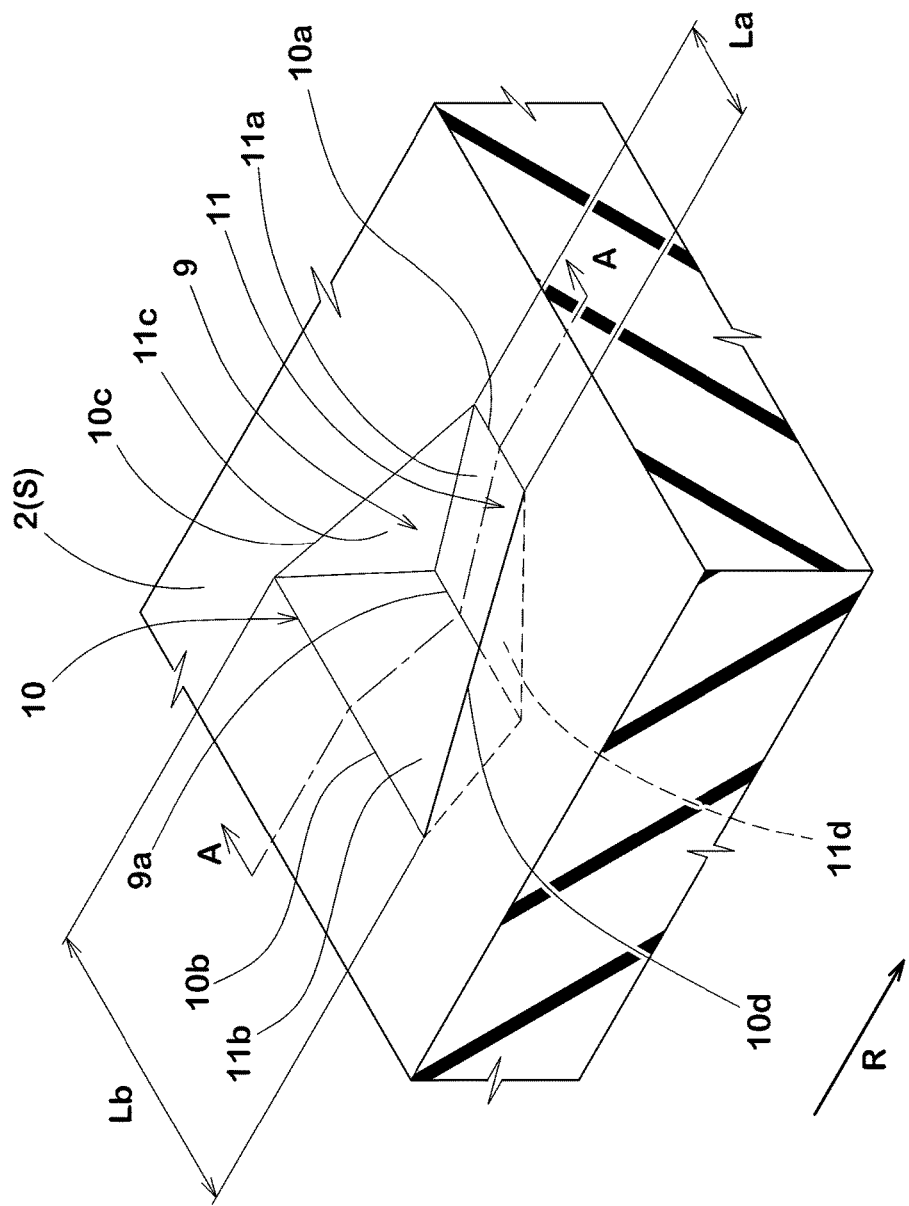
FIG. 3 is a perspective view of a cooling recess portion of an embodiment of the invention.

FIG. 3 illustrates an enlarged perspective view of the recess portion 9. As shown in FIG. 3, the recess portion 9 includes an opening edge 10 opened at the ground contacting surface S of the tread portion 2 and an inner wall 11 extending inward of the tread portion 2 from the opening edge 10. The opening edge 10 is an edge formed between the ground contacting surface S and the inner wall 11 that is recessed inwardly from the ground contacting surface S.

The opening edge 10 includes a linearly extending first edge 10a and a linearly extending second edge 10b facing one another, and has a closed contour shape. In this embodiment, the first edge 10a is parallel with the second edge 10b. Alternatively, these edges may be arranged so as to form an angle of not more than 20 degrees. The interpretation of "linearly" is intended to include deformation during molding, and other lines such as an arc having a radius of curvature of more than 100 mm may fall within the scope of it, for example.

The opening edge 10 in accordance with the present embodiment, for example, includes a linearly extending third edge 10c and a linearly extending fourth edge 10d. The third edge is connected between one end of the first edge 10a and one end of the second edge 10b. The fourth edge 10d is connected between the other end of the first edge 10a and the other end of the second edge 10b.

The inner wall 11 includes a first wall 11a that extends from the first edge 10a to the deepest bottom 9a of the recess portion 9 and a second wall that extends from the second edge 10b to the bottom 9a. In this embodiment, the inner wall 11 further includes a third wall 11c that extends from the third edge 10c to the bottom 9a and a fourth wall 11d that extends from the fourth edge 10d to the bottom 9a.

Figure 4:
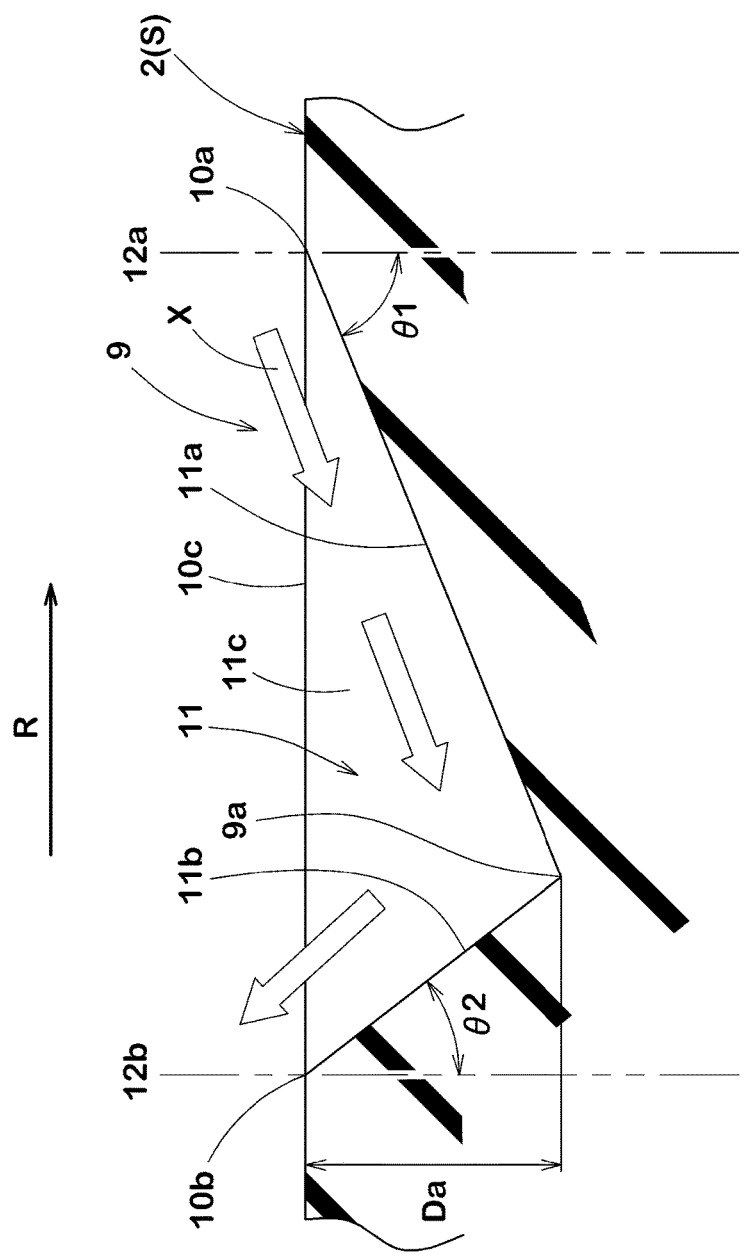
FIG. 4 is a cross-sectional view taken along a line A-A of FIG. 3.

FIG. 4 illustrates a cross-sectional view taken along a line A-A of FIG. 3. As shown FIG. 4, the inclination angle θ1 of the first wall 11a with respect to the first normal line 12a to the ground contacting surface S passing the first edge 10a is greater than the inclination angle θ2 of the second wall 11b with respect to the second normal line 12b to the ground contacting surface S passing the second edge 10b.

According to the recess portion 9 in accordance with the present embodiment, as shown the arrow X in FIG. 4, air flowing around the tread portion 2 during tire traveling easily tends to be introduced into a space of the inner wall 11 along the first wall 11a that has a large inclination angle θ1. The air can offer heat exchange with the first wall 11a during flowing along the first wall 1a. Then, the air flowing along the first wall 11a comes into contact with the steep second wall 11b that has a small inclination angle θ2, which is a substantially right angle, and then the air is released from the recess portion 9 along the second wall 11b. In such a process, the air flowing along the first wall 11a comes into contact with the second wall 11b vigorously so that heat is exchanged efficiently between the air and the entire surface of the second wall 11b. As described above, the recess portion 9 in accordance with the present embodiment may offer efficient heat exchange among air, the first wall 11a and the second wall 11b by generating a preferably air flow in the inner wall actively. Accordingly, heat dissipation through the recess portion 9 may further be improved.

The tire 1 in accordance with the present embodiment may prevent temperature rise of the tread portion 2 due to sufficient heat dissipation. Thus, a blow out of the tread portion 2, for example, can be prevented, and the tire durability is improved.

Regarding the recess portion 9 in accordance with the present embodiment, the air introduced into the inner wall 11 along the first wall 11a may further exchange heat with the third wall 11c as well as the fourth wall 11d. Thus, heat exchange effect of the recess portion 9 may further be improved and thereby preventing temperature rise of the tread portion 2.

The contour shape of the opening edge 10 is not particularly limited, but preferably includes a trapezoidal shape having the second edge 10b being longer than the first edge 10a as shown in FIG. 3. Such a recess portion 9 may provide a width of the inner wall 11 that becomes bigger toward the downstream when the air flows from the first edge 10a to the second edge 10b. Accordingly, the heat exchange effect of the recess portion 9 may further be improved because much air may be come into contact with the second wall 11b.

Preferably, the length Lb of the second edge 10b in accordance with the present embodiment is in a range of from 3.0 to 10.0 mm, for example. When the length Lb is less than 3.0 mm, it may be difficult to obtain sufficient heat exchange effect. On the other hand, when the length Lb is more than 10.0 mm, rigidity of the inboard shoulder land portion 4Si may be deteriorated. In view of the above, the length Lb of the second edge 10b is more preferably in a range of from 4.0 to 9.0 mm.

The length La of the first edge 10a, in the same point of view of the second edge 10b, is preferably in a range of from 1.0 to 3.3 mm, more preferably in a range of from 1.3 to 3.0 mm.

The first edge 10a and the second edge 10b, for example, extend at an angle of not more than 10 degrees with respect to the axial direction of the tire. Since such a recess portion 9 may introduce much air into the inner wall 11 due to rotation of the tire, heat exchange effect of the recess portion 9 may further be improved.

Preferably, the second edge 10b, for example, is located backward of the first edge 10a in the rotational direction R. Such a recess portion makes much air come into contact with the second wall 11b, and thereby improving heat dissipation effect.

As shown in FIG. 4, the inclination angle θ2 of the second wall 11b is preferably in a range of from 30 to 85 degrees. When the inclination angle θ2 is less than 30 degrees, a large contacting impact between the air introduced in the inner wall 11 and the second wall 11b tends to happen, and then air may stay in the space of the inner wall 11, and therefore sufficient heat dissipation may not be obtained. On the other hand, the inclination angle θ2 is more than 85 degrees, it may be difficult to obtain sufficient heat exchange effect. In view of the above, the inclination angle θ2 of the second wall 11b is more preferably in a range of from 40 to 70 degrees.

Preferably, the inclination angle θ1 of the first wall 11a, for example, is in a range of from 40 to 88 degrees. When the inclination angle θ1 is less than 40 degrees, it may be difficult to introduce air to the bottom 9a of the recess portion 9. On the other hand, the inclination angle θ1 is more than 88 degrees, it may be difficult to ensure sufficient depth Da of the bottom 9a from the ground contacting surface S of the tread portion 2, and heat dissipation effect may not be obtained sufficiently since enough surface area of the first wall 11a and the second wall 11b cannot be offered. In view of the above, the inclination angle θ1 of the first wall 22a is more preferably in a range of from 50 to 80 degrees.

Preferably, the depth Da of the bottom 9a of the recess portion 9, for example, is in a range of from 2.0 to 8.0 mm. When the depth Da is less than 2.0 mm, it may be difficult to achieve heat dissipation of the recess portion 9. On the other hand, when the depth Da is more than 8.0 mm, rigidity of the inboard shoulder land portion 4Si may not be ensured sufficiently. In view of the above, the depth Da of the bottom 9a is more preferably in a range of from 3.0 to 7.0 mm.

In this embodiment, the first wall 11a and the second wall 11b are sharply connected one another at the bottom 9a of the recess portion 9 without providing any chamfer. In such a recess portion 9, the air flowing into the inner wall 11 along the first wall 11a possibly comes into contact with the entire surface of the second wall 11b, sufficient heat exchanging may be achieved. When a chamfered portion is provided at the corner between the first wall 11a and the second wall 11b, the radius of curvature of the chamfered portion is preferably in a range of not more than 0.7 mm.

Figure 5:
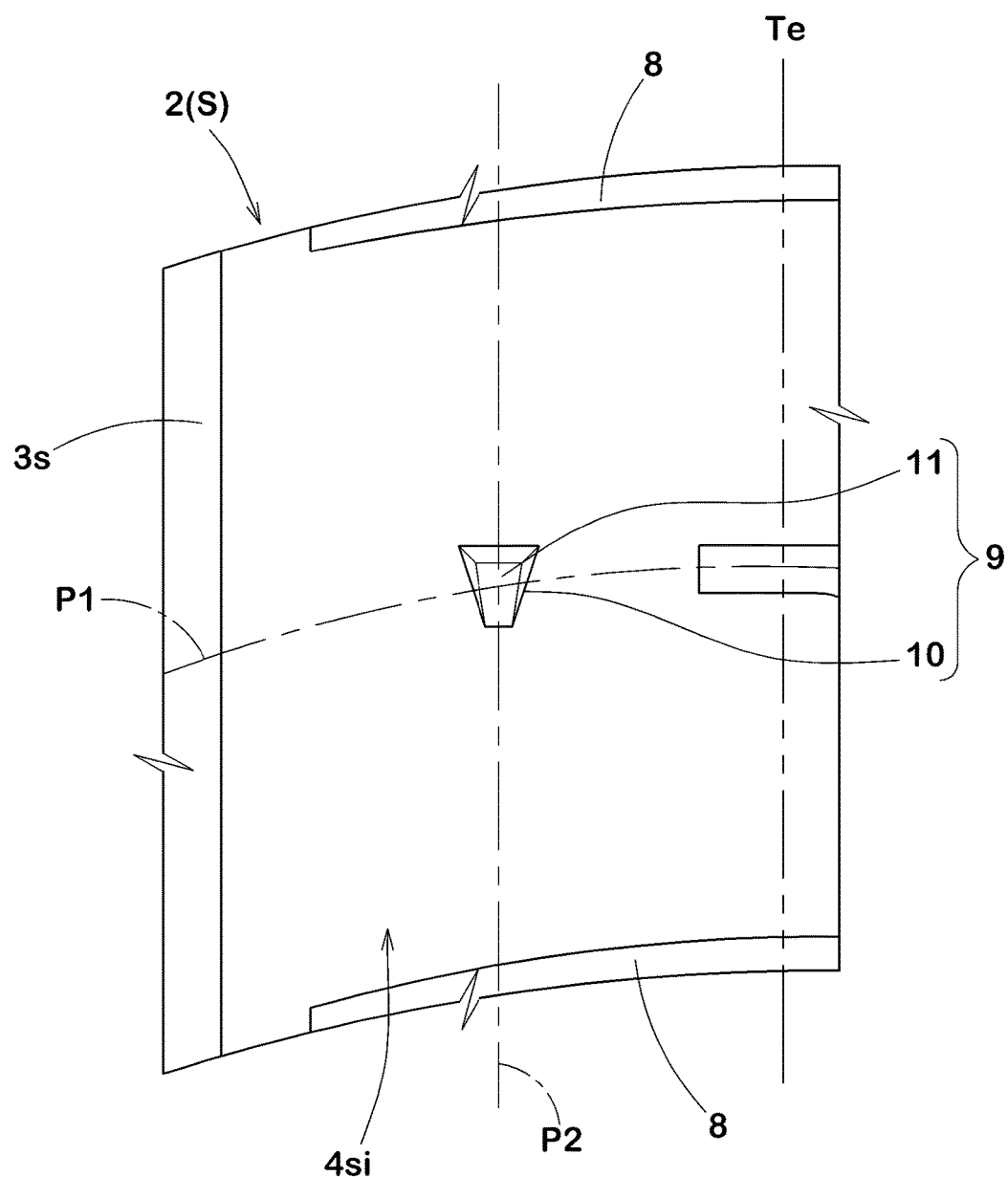
FIG. 5 is a partial enlarged view of a portion around a shoulder portion of FIG. 1.

FIG. 5 illustrates an enlarged view a portion around the inboard shoulder land portion 4Si of FIG. 1. The opening edge 10 of the recess portion 9 in accordance with the present embodiment, in a planar view of the inboard shoulder land portion 4Si, is arranged at a middle location that includes a center position P1 between a pair of circumferentially adjacent shoulder lateral grooves 8. In this preferred embodiment, the opening edge 10 of the recess portion 9, in a planar view of the inboard shoulder land portion 4Si, is arranged at a location that includes a center portion P2 of the inboard shoulder land portion 4Si in the axial direction of the tire. According to the recess portion 9, rigidity balance of the inboard shoulder land portion 4Si may be ensured.

In this embodiment, a total opening area of the recess portion 9 is preferably in a range of from 0.05% to 2.0% of the entire outer surface area of the tread portion 2 which is obtained by filling up the entire grooves thereon. Thus, the recess portion 9 may prevent temperature rise while ensuring rigidity of the tread portion 2.

The tire 1 in accordance with the present embodiment may be installed to a vehicle with negative camber in order to offer high cornering performance. In such a tire, inboard of the tire 1 is subjected to a large load and which increases friction to the road and causes temperature rise of the tread portion. Furthermore, since the inboard of the tire 1 is subjected to face a braking system including a braking pad that becomes high temperature, the inboard of the tire 1 also tends to become high temperature. The recess portion 9 in accordance with the present embodiment is provided on the inboard shoulder land portion 4Si, temperature rise of the inboard shoulder land portion 4Si may be prevented. However, the location of the recess portion 9 is not particularly limited to the aspect described above. For example, the recess portion 9 in accordance with the present invention may be arranged on either one of the inboard crown rib 4Ci, the outboard crown rib 4Co, inboard middle land portion 4M, the outboard shoulder land portion 4So, or the inboard shoulder land portion.

Figure 6:
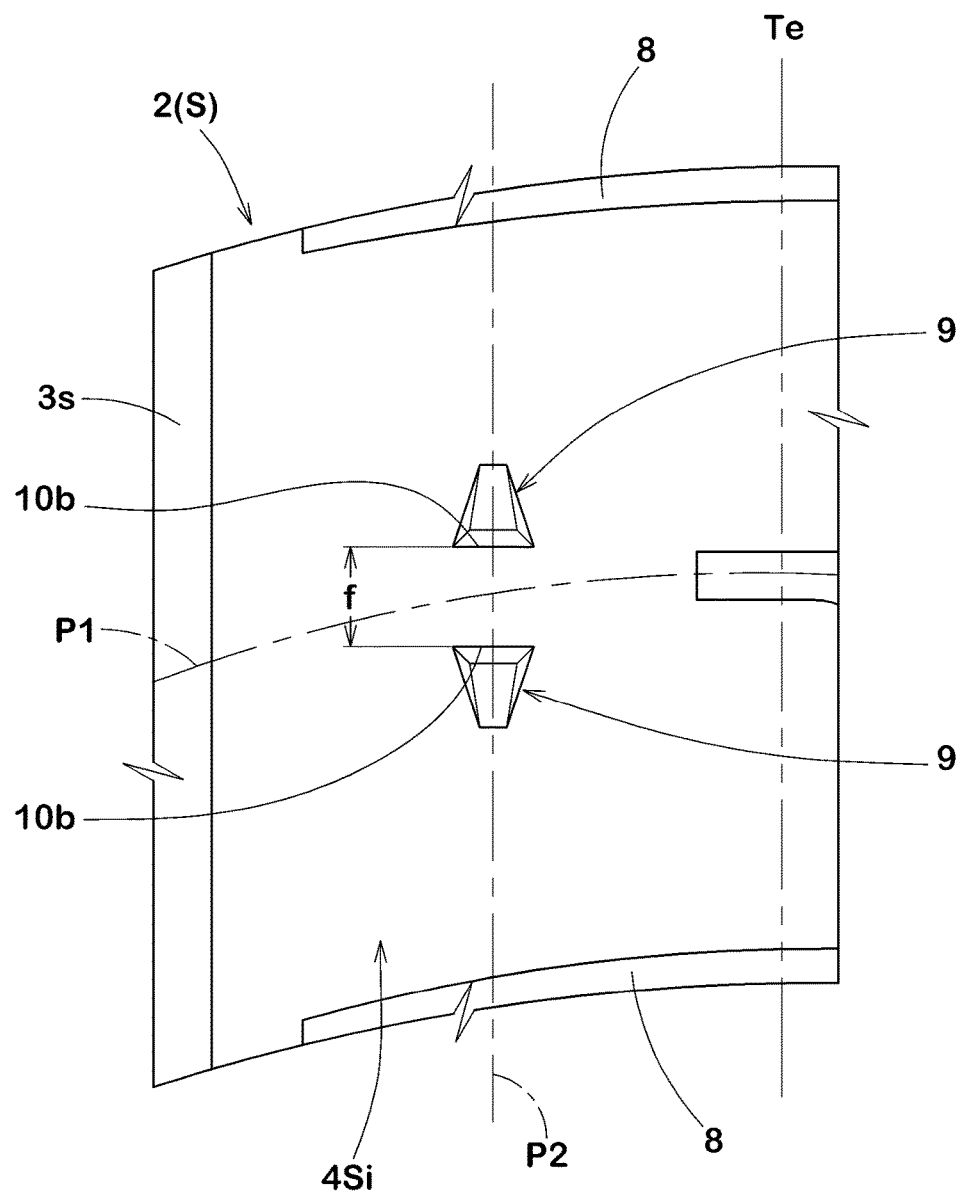
FIG. 6 is a partial enlarged view of a portion around the shoulder portion in accordance with another embodiment of the invention.

FIG. 6 illustrates a partial enlarged view of the tread portion 2 in accordance with another embodiment of the present invention. In this embodiment, a specified rotational direction R is not designated to the tire. Furthermore, two recess portions 9 are provided between a pair of adjacent shoulder lateral grooves 8 on the inboard shoulder land portion 4Si. These recess portions 9 are arranged so that the respective second edges 10b face one another with a space f. Either one of the recess portions 9 may offer efficient heat dissipation to prevent temperature rise according to either one of a tire rotational direction R.

In the embodiment illustrated in FIG. 6, the space f between the recess portions 9, in a planar view of the inboard shoulder land portion 4Si, is located to include the middle position between a pair of circumferentially adjacent shoulder lateral grooves 8. According to the configuration, high and well balanced rigidity of the inboard shoulder land portion 4Si may be ensured. In the same point of view, the space f preferably has a distance in a range of from 5.0 to 10. mm.

In any embodiments of the invention, the shoulder lateral grooves 8 may be connected to the inboard shoulder main grooves 3s. In this case, the inboard shoulder land portion 4Si is formed as a block row including a plurality of blocks. The opening edge 10 of the recess portion 9 or the space f, in a planar view of the block, is preferably arranged to include a location of the gravity center of the block so that rigidity balance of the block may be ensured.

Furthermore, in any embodiments of the invention, the slots 6b, 7c and 14b, and the circular slot 6c may be replaced the recess portion 9. Due to heat dissipation through a lot of recess portions 9, temperature rise of the tread portion 2 may further be improved and thereby durability of the tire may further be improved.

While the particularly preferable embodiments of the invention have been described in detail, the present invention is not limited to the illustrated embodiments, but can be modified and carried out in various aspects.

EXAMPLE

Pneumatic tires of 235/40R20 having a basic pattern of FIG. 1 and the details shown in Table 1 were manufactured, and then performances thereof were tested. The tire of Ref. 1 had no cooling recess portion on its shoulder portion. The tire of Ref. 2 was provided with cylindrical slots having an outer diameter of 5 mm and a depth of 5 mm instead of recess portions on the shoulder portion. In each example tire and Ref. 2, one recess portion was provided on each inboard shoulder block-like element as shown in FIG. 1. The test procedures are as follows:

Steering Stability:

Each test tire was installed to all wheels of a test vehicle with an internal pressure of 210 kPa. A test driver drove the test vehicle as fast as possible on a racing circuit, and then evaluated steering stability by his feeling. The results are shown using an index of Ex. 1 being 100. The larger the value, the better the performance is.

Tire Durability Performance:

After traveling the racing circuit as fast as possible, inboard shoulder portion of each test tire was observed by naked eyes. The test results were evaluated reciprocal of the number of blowholes generated on the shoulder portion, and were shown in Table 1 using an index based on Ex. 1 being 100. The larger the value, the better the durability performance is.

TABLE 1

|  | Ref. 1 | Ref. 2 | Ex. 1 | Ex. 2 | Ex. 3 | Ex. 4 | Ex. 5 | Ex. 6 | Ex. 7 |
| --- | --- | --- | --- | --- | --- | --- | --- | --- | --- |
| Recess portion | None | Presence (Circular) | Presence | Presence | Presence | Presence | Presence | Presence | Presence |
| Second edge length Lb (mm) | — | — | 6 | 3 | 10 | 6 | 6 | 6 | 6 |
| First edge length La (mm) | — | — | 2 | 1 | 3.3 | 2 | 2 | 2 | 2 |
| Depth Da of bottom (mm) | — | — | 4 | 2 | 8 | 4 | 4 | 4 | 4 |
| Inclination angle θ2 (deg.) | — | — | 35 | 50 | 25 | 30 | 40 | 35 | 35 |
| Inclination angle θ1 (deg.) | — | — | 55 | 70 | 45 | 60 | 60 | 50 | 80 |
| Steering stability (Index) | 110 | 100 | 100 | 102 | 80 | 100 | 100 | 102 | 98 |
| Tire durability (Index) | 80 | 90 | 100 | 95 | 115 | 98 | 100 | 95 | 100 |

As shown in Table 1, it was confirmed that each example tire had an excellent steering stability and durability while ensuring rigidity of the tread portion.

REFERENCE SIGNS LIST

1 Pneumatic tire
2 Tread portion
9 Recess portion
9a Bottom
Opening edge
10a First edge
10b Second edge
11 Inner wall
11a First wall
11b Second wall
θ1 Inclination angle
θ2 Inclination angle

The invention claimed is:

1. A pneumatic tire comprising:
a tread portion comprising a tread pattern having a designated rotational direction, the tread portion provided with a plurality of cooling recess portions;
the plurality of recess portions each comprising a trapezoidally shaped opening edge opened at a ground contacting surface of the tread portion and an inner wall extending inward of the tread portion from the opening edge;
the trapezoidally shaped opening edge comprising a linearly extending first edge and a linearly extending second edge facing one another,
wherein the second edge is longer than the first edge and wherein the plurality of cooling recess portions having the trapezoidal shaped opening edge consists of cooling recess portions each having the second edge being located backward of the first edge in the rotational direction;
the inner wall comprising, in a cross-section perpendicular to the first edge, a first wall that extends from the first edge to a deepest bottom of the recess portion and a second wall that extends from the second edge to the bottom; and
an inclination angle θ1 of the first wall with respect to a first normal line to the ground contacting surface passing the first edge being greater than an inclination angle θ2 of the second wall with respect to a second normal line to the ground contacting surface passing the second edge.

2. The pneumatic tire according to claim 1, wherein the trapezoidally shaped opening edge comprises a closed contour shape.

3. The pneumatic tire according to claim 1, wherein the inclination angle θ2 of the second wall is in a range of from 30 to 85 degrees.

4. The pneumatic tire according to claim 1, wherein the first edge and the second edge extend at an angle of not more than 10 degrees with respect to an axial direction of the tire.

5. The pneumatic tire according to claim 1, wherein the first wall and the second wall are sharply connected to one another at the bottom.

6. The pneumatic tire according to claim 1, wherein the second edge has a length in a range of from 3.0 to 10.0 mm.

7. The pneumatic tire according to claim 1, wherein the bottom of the recess portion has a depth in a range of from 2.0 to 8.0 mm from the ground contacting surface of the tread portion.

8. The pneumatic tire according to claim 1, wherein
the tread portion comprises a tread pattern having an installing direction to a vehicle and a plurality of land portions separated by a plurality of main grooves, and
the plurality of cooling recess portions having the trapezoidally shaped opening edge are provided on the land portion located most inboard of the vehicle when the tire is installed to the vehicle.

9. The pneumatic tire according to claim 1, wherein
the tread portion comprises a plurality of block elements separated by a plurality of lateral grooves, and
in a planar view of one of the block elements, the opening edge is arranged at a location which includes a center position of a pair of circumferentially adjacent lateral grooves.

10. The pneumatic tire according to claim 1, wherein the first wall and the second wall are intersects at the bottom to form a V-shape.

11. The pneumatic tire according to claim 10, wherein the inclination angle θ1 of the first wall is in a range of from 30 to 50 degrees and the inclination angle θ2 of the second wall is in a range of from 45 to 80 degrees.

12. A pneumatic tire comprising:
a tread portion comprising a tread pattern having a designated rotational direction, the tread portion provided with at least one cooling recess portion;
the recess portion comprising an opening edge opened at a ground contacting surface of the tread portion and an inner wall extending inward of the tread portion from the opening edge;
the opening edge comprising a linearly extending first edge and linearly extending second edge facing one another, wherein the opening edge comprises a trapezoidal shape having the second edge longer than the first edge and wherein the second edge is located backward of the first edge in the rotational direction;

the inner wall comprising, in a cross-section perpendicular to the first edge, a first wall that extends from the first edge to a deepest bottom of the recess portion and a second wall that extends from the second edge to the bottom, wherein the first wall and the second wall intersect at the bottom to form a V-shape; and an inclination angle $\theta 1$ of the first wall with respect to a first normal line to the ground contacting surface passing the first edge being greater than an inclination angle $\theta 2$ of the second wall with respect to a second normal line to the ground contacting surface passing the second edge.

13. The pneumatic tire according to claim 12, wherein the inclination angle $\theta 1$ of the first wall is in a range of from 30 to 50 degrees and the inclination angle $\theta 2$ of the second wall is in a range of from 45 to 80 degrees.

14. The pneumatic tire according to claim 13, wherein the difference between the inclination angle $\theta 1$ and the inclination angle $\theta 2$ is in a range of from 15 to 45 degrees.

* * * * *